(12) United States Patent
Lawrence

(10) Patent No.: US 6,961,695 B2
(45) Date of Patent: Nov. 1, 2005

(54) GENERATING HOMOPHONIC NEOLOGISMS

(75) Inventor: Stephen Graham Copinger Lawrence, Southampton (GB)

(73) Assignee: International Business Machines Corportion, Armonk, NY (US)

(*) Notice: Subject to any disclaimer, the term of this patent is extended or adjusted under 35 U.S.C. 154(b) by 618 days.

(21) Appl. No.: 10/194,044

(22) Filed: Jul. 10, 2002

(65) Prior Publication Data

US 2003/0049588 A1 Mar. 13, 2003

(30) Foreign Application Priority Data

Jul. 26, 2001 (GB) .............................................. 0118184

(51) Int. Cl.[7] .......................... G06F 17/28; G06F 17/21; G06F 15/00
(52) U.S. Cl. .............................. 704/10; 704/7; 715/533
(58) Field of Search ........................ 704/10, 7; 715/533

(56) References Cited

U.S. PATENT DOCUMENTS

| | | | | |
|---|---|---|---|---|
| 5,930,754 A | * | 7/1999 | Karaali et al. .............. 704/259 |
| 5,983,177 A | * | 11/1999 | Wu et al. .................... 704/244 |
| 6,243,680 B1 | * | 6/2001 | Gupta et al. ................. 704/260 |
| 6,256,630 B1 | * | 7/2001 | Gilai et al. ..................... 707/6 |
| 6,347,295 B1 | * | 2/2002 | Vitale et al. ................ 704/209 |
| 6,829,580 B1 | * | 12/2004 | Jones .......................... 704/257 |

* cited by examiner

Primary Examiner—Tālivaldis Ivars Šmits
Assistant Examiner—Myriam Pierre
(74) Attorney, Agent, or Firm—Akerman Senterfitt

(57) ABSTRACT

A homophonic neologisms generator can include a dictionary table (10) having one or more entries including an orthography and an associated pronunciation including one or more phonemes; and a weightings table (14) having one or more entries specifying a cluster including one or more letters, a cluster pronunciation including one or more phonemes, and a weighting for the pronunciation of the cluster. A user interface can receive a word for which neologisms can be generated. A clustering mechanism can divide the pronunciation into a plurality of phonemes having one or more orthographic representations. Each orthographic representation can include one or more graphemes. Orthographic representations of the pronunciation can be ordered according to the associated weightings of the cluster graphemes in the weightings table and the dictionary can be searched to check that a generated well-formed orthography does not exist.

12 Claims, 3 Drawing Sheets

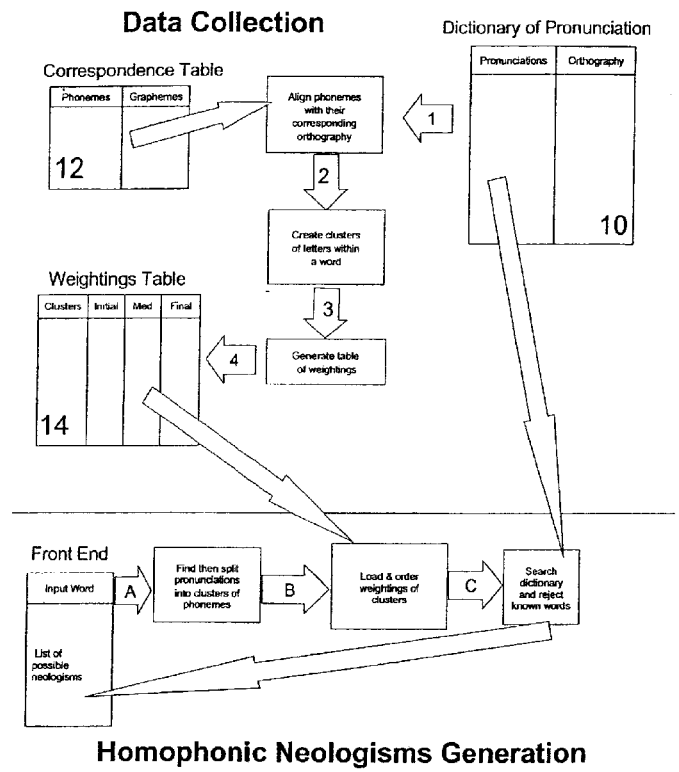

Homophonic Neologisms Generation

Data Collection

Correspondence Table

| Phonemes | Graphemes |
|---|---|
| | |

12

Align phonemes with their corresponding orthography

Dictionary of Pronunciation

| Pronunciations | Orthography |
|---|---|
| | |

10

Create clusters of letters within a word

Weightings Table

| Clusters | Initial | Med | Final |
|---|---|---|---|
| | | | |

14

Generate table of weightings

Front End

Input Word → A → Find then split pronunciations into clusters of phonemes → B → Load & order weightings of clusters → C → Search dictionary and reject known words List of possible neologisms

Homophonic Neologisms Generation

Figure 1

| Phone | Pos. | Var. | Graph. | Weighting | Sample |
|---|---|---|---|---|---|
| 0 | 1 | 1 | _ | 0 | NONE |
| w | 2 | 1 | w | 962731 | was |
| w | 2 | 2 | wh | 960422 | which |
| w | 2 | 3 | ou | 60001 | ouija |
| w | 2 | 4 | qu | 20068 | acquaint |
| w | 2 | 5 | h | 20007 | ayahuasca |
| w | 2 | 6 | u | 20002 | language |
| w | 2 | 7 | r | 20001 | croisant |
| 0 | 3 | 1 | _ | 0 | NONE |
| o | 4 | 1 | o | 973566 | hot |
| o | 4 | 2 | a | 960656 | was |
| o | 4 | 3 | au | 960042 | because |
| o | 4 | 4 | ow | 960024 | rowlock |
| o | 4 | 5 | e | 960024 | ensemble |
| o | 4 | 6 | oe | 960018 | roentgen |
| o | 4 | 7 | eau | 960011 | bureaucracy |
| o | 4 | 8 | ou | 960004 | cough |
| o | 4 | 9 | i | 960004 | lingerie |
| o | 4 | 10 | aw | 960003 | lawrence |
| 0 | 5 | 1 | _ | 0 | NONE |
| z | 6 | 1 | s | 987222 | was |
| z | 6 | 2 | z | 960026 | fez |
| z | 6 | 3 | x | 960006 | anxiety |
| 0 | 7 | 1 | _ | 975858 | NONE |

Figure 2

| Entry | Phone | Pos. | Var. | Graph. | Weighting | Sample |
|---|---|---|---|---|---|---|
| 1 | z | 6 | 1 | s | 987222 | was |
| 2 | 0 | 7 | 1 | _ | 975858 | NONE |
| 3 | o | 4 | 1 | o | 973566 | hot |
| 4 | w | 2 | 1 | w | 962731 | was |
| 5 | o | 4 | 2 | a | 960656 | was |
| 6 | w | 2 | 2 | wh | 960422 | which |
| 7 | o | 4 | 3 | au | 960042 | because |
| 8 | z | 6 | 2 | z | 960026 | fez |
| 9 | o | 4 | 4 | ow | 960024 | rowlock |
| 10 | o | 4 | 5 | e | 960024 | ensemble |
| 11 | o | 4 | 6 | oe | 960018 | roentgen |
| 12 | o | 4 | 7 | eau | 960011 | bureaucracy |
| 13 | z | 6 | 3 | x | 960006 | anxiety |
| 14 | o | 4 | 8 | ou | 960004 | cough |
| 15 | o | 4 | 9 | i | 960004 | lingerie |
| 16 | o | 4 | 10 | aw | 960003 | lawrence |
| 17 | w | 2 | 3 | ou | 60001 | ouija |
| 18 | w | 2 | 4 | qu | 20068 | acquaint |
| 29 | w | 2 | 5 | h | 20007 | ayahuasca |
| 20 | w | 2 | 6 | u | 20002 | language |
| 21 | w | 2 | 7 | r | 20001 | croisant |
| 22 | 0 | 1 | 1 | _ | 0 | NONE |
| 23 | 0 | 3 | 1 | _ | 0 | NONE |
| 24 | 0 | 5 | 1 | _ | 0 | NONE |

Figure 3

GENERATING HOMOPHONIC NEOLOGISMS

CROSS-REFERENCE TO RELATED APPLICATIONS

This application claims the benefit of Application No. 0118184.1, filed Jul. 26, 2001, at the United Kingdom Patent Office.

BACKGROUND OF THE INVENTION

Technical Field

The present invention relates to the generation of homophonic neologisms, i.e. the generation of words with new spellings not to be found in a dictionary that are pronounced the same as words found in a dictionary.

BRIEF DESCRIPTION OF THE DRAWINGS

There are shown in the drawings, embodiments which are presently preferred, it being understood, however, that the invention is not limited to the precise arrangements and instrumentalities shown.

FIG. 1 is a schematic diagram of a homophonic neologisms generator according to the invention.

FIG. 2 is an extract from the weightings table of FIG. 1.

FIG. 3 shows a generating order for neologisms, generated by the homophonic neologisms generator of FIG. 1.

DETAILED DESCRIPTION OF THE INVENTION

The present invention provides a homophonic neologism generator. The invention utilizes a data collection component for generating a weightings table for a phonetic spell checker. One objective of a homophonic neologism generator is to list the most likely spellings from a phonemic representation of a word. For example, the word "was" could be spelled "waz", "woz", "whos", "whoz", etc.

The present invention operates by using a table of weightings, FIG. 2, which contains the frequencies of spelling occurrences of the sounds that correspond to the letters in a word. The information contained in the table enables the homophonic neologisms generator to decide, for example, that the most likely new spelling of "was" is "wos".

The homophonic neologisms generator can be implemented in two parts: a data collection process which can generate the table of weightings and a homophonic neologisms generation process which can use the weightings table to produce a list of possible new spellings sorted in order of homophonic similarity.

Data Collection

1. Align Phonemes with their Corresponding Orthography

Referring now to FIG. 1, a dictionary of pronunciations 10 can include a list of words, each with a respective orthography and pronunciation key. The pronunciation key can include one or more phonemes for a word. In a first stage, the dictionary can be read and each word's orthography can be aligned with the corresponding phonemes as described in "Alignment of phonemes with their corresponding orthography", Computer Speech and Language (1986), using a table 12 containing clusters of letters (graphemes) and the sounds used when speaking the letters (phonemes). The table 12 can be constructed so that only strings of letters corresponding to single phonemes are held in the table. Thus, there is an entry for the string "augh" as it can be pronounced as a single phoneme that sounds like "or" as in the word "daughter". It should be noted that some strings of letters may be silent and so are represented by a silent phoneme in the table 12.

2. Create Clusters of Letters within a Word

Each word in the dictionary can be split into clusters of letters using the data contained in the correspondence table 12. All geminate consonant letters in a word can be converted into single letters. For example, the word "letter" is converted to "leter". A word can be scanned from left to right and a table look up can be performed to find the longest string of letters that has an entry in the correspondence table. There are a number of exceptions to this method. For example, in the word "being", the "e" can be separated from the "ing" despite the fact that there are instances of "ei" in the correspondence table. Another exception can be where three vowels appear together. The following vowel groupings can be split so that the first vowel forms a cluster and the last two vowels form a cluster—aoi, eoi, iao, iai, iau, ioi, oau, uia, uau, and uou.

A more general example of clustering, however, can be the word "laugh". The word "laugh" can be successfully tested to determine if a grapheme exists in the table for "laugh", "laug", "lau", "la", and finally "l". A grapheme exists for "l" only and the entry for this pronunciation in the weightings table is incremented. "augh" is now tested and a grapheme represented by a single phoneme exists in the correspondence table. Accordingly, the entry for "augh" is incremented in the weightings table. Thus, laugh is broken into two clusters "l" and "augh".

3. Generate Table of Weightings

Having split the word into clusters, the sounds for each of the clusters can be assigned and a count of the correspondence can be saved in preparing the weightings table 14. The position of the cluster also can be noted. There are three notable positions for the cluster: initial, medial, and final. Thus, taking the grapheme "I", its number of occurrences in the dictionary at the start of a word where it is associated with a given phoneme can be counted and recorded in the weightings table. A similar determination can be performed for each pronunciation of "I" where "I" appears in medial and final clusters. The more often a grapheme is pronounced as a given phoneme, the heavier its weighting will be.

FIG. 2 shows data for w, o, and z clusters. The table is arranged so that the clusters are the phonemes for the word "was" and the column of graphemes specifies a variety of letter clusters that can be spoken the same as the letters "w", "a" and "s" in the word "was". In the figure, the following conventions have been observed.

Pos. is the position of the cluster within a word. In order to take into account the possibility of silent letters occurring in a word, an extra 'silent' cluster is inserted before and after each phoneme. There are 7 clusters in the pronunciation of "was".

Var. is the number of the variant pronunciation for the cluster.

NONE in the sample column indicates that there are no samples, but the variant has been generated by changing a phoneme from a voiced phoneme to the corresponding unvoiced phoneme or vice versa.

0 in the Cluster column indicates a silent phoneme and is represented by the "_" grapheme.

We can see that the phoneme "o" has 10 different letter combinations (graphemes), the most common of these being "o" as in "hot".

When the complete dictionary has been read, the weightings table can be modified to add more cluster sounds even though they do not occur in the dictionary as ways in which a cluster can be pronounced. All additions can have reduced weightings as compared to those that occur in the dictionary. The following modifications can be made.

Clusters not appearing in all of the initial, medial, or final positions can be added to the list of clusters for those positions.

Voiced sounds can be generated for unvoiced sounds and vice versa. For example, phonemic "g" can be converted to phonemic "k" and vice versa.

If a correspondence of schwa and an orthographic cluster beginning with a vowel does not exist, then one is added.

To handle dropped aitches, clusters beginning with phonemic "h" can be generated where one does not exist for orthographic clusters that begin with a vowel.

Homophonic Neologisms Generation.

A. Create Clusters of Phonemes from the Pronunciation of a Word

Through a front-end user interface, the end user can enter a word for which the user wants neologisms to be generated. The pronunciation for the word can be found in the dictionary and the pronunciation can be split into phonemes, each separated by a possible silent phoneme. In the example the word "was" was entered.

B. Load and Order Weightings of Clusters

The orthographic variants (clusters of graphemes) for each of the phonemes can be extracted from the weightings table and sorted into descending weighting order. A sample of the sorted weightings is shown in FIG. 3. FIG. 3 contains data for the input "woz" which is how the word "was" is spoken. Note that the orthographic variants are those pertaining to the position of the phoneme within the word wherein "w" is initial, "o" is medial, and "z" is final. The most likely new spelling for the word "was" will be the most common orthographic of "w" in an initial position, "o" in a medial position, and "z" in a final position. The next combination to be searched can use the second most common orthographic variant of "o" in the medial position, as the second most common orthographic variant of "w" and "z" in their respective positions are not as common. The ordering continues until the system arrives at the least common spelling of the phonemes in their respective positions.

C. Search Dictionary

In the sorted extract from the sample weightings table there are 7 orthographic variants of "w", 10 orthographic variants for "o", 3 for "z", and no spellings for any silent phoneme. There are 210 possible new spellings for "was". This is a simple example. The problem to solve is how to generate new spellings so that the most likely ones are presented as the first in the list of generated neologisms and the least likely last, without generating all possible spellings.

Using the sorted weightings table the most likely spelling can be constructed by using the first orthographic variant for each phoneme. For "woz" this is "_w_o_s_". The silence can be eliminated leaving a possible new spelling of "wos".

A table of silent letters can be maintained so that silent letters can replace the silent phoneme provided the silent letters occur in other words between like sounds. In FIG. 3, in Entry 6, the graphemes "wh" appear yet the "h" is silent. During the data collection processing it was decided to leave "wh" as an orthographic variant for the phoneme "w" rather than have "h" as a silent letter. In the word "graham" the "h" is silent and in the weightings table the silent "h" would appear with a weighting based on how frequently a silent "h" occurs between the sounds of the first and second vowels in "graham". During the generation of neologisms for "graham", the sorted weightings table would have a grapheme of "h" associated with the silent phoneme inserted between the phonemes for the sounds of the two vowels in "graham". One of the neologisms generated from "graham" would be "grayhem".

Before a search of the dictionary is made, a check can be made that the new spelling is well-formed, that is, that the new spelling conforms to the rules for syllabification having syllables that might begin with valid clusters of consonants followed by valid clusters of vowels and possibly terminated by a valid cluster of consonants. Exceptions can be made for spellings that can be constructed by substituting the sounds of letters and numbers with the graphemes for the letters and numbers. Thus the word "before" can be spelled "b4".

Consonants may be doubled when following a stressed vowel. If an alternative spelling of 'better' is being sought, the pronunciation might be 'beta'. Because the 'e' is stressed, however, the neologism can be spelled 'betta' so as to distinguish it from the pronunciation of the second letter of the Greek alphabet.

A search of the dictionary, using the spelling as the key, finds that the spelling "wos" is not in the dictionary. This spelling can be saved in the list of possible neologisms presented to the end user.

The sorted extract of the weightings table can be used to find the next most likely spelling. The fifth entry contains "a" for the fourth phoneme. The spelling "was" is in the dictionary, so "was" can be discarded. The sixth entry contains "wh" pronounced as "w". There is no entry in the dictionary for the spelling "whas", so "whas" can be added to the list of neologisms.

It will be seen that the homophonic neologism generator according to the invention may be implemented within a computer system in any number of ways. It can operate as a stand alone program wherein a user can input a single word through an entry field such that the invention can obtain a list of neologisms in order of probability within a scroll bar. The invention also can be incorporated into a system that transforms e-mail for presentation on a telephone display using Short Messaging Services or as a brainstorming tool when choosing names for companies and products. Another useful implementation can be a trademark searching tool to search on names which might be confused with the input word. The techniques disclosed herein also can be useful in any language understanding or processing facility where perhaps text abbreviation or expansion is being carried out.

What is claimed is:

1. A homophonic neologisms generator comprising:

a dictionary table having a plurality of word entries each including an orthography and an associated pronunciation, said pronunciation comprising one or more phonemes, said orthography comprising one or more graphemes;

a weightings table having a plurality of entries, each comprising a frequency of occurrence of each phoneme and associated grapheme in the dictionary table, each phoneme having an entry for each grapheme with which the phoneme is associated;

interface means for receiving a word to be processed;

clustering means for dividing said word into its respective phonemes; and neologism means for creating a word for each combination of graphemes from the weightings table that could be associated with the phonemes in the received word;

whereby the created words are homophonically similar to the received word.

2. A generator as in claim 1, further comprising:
ordering means for ranking the created words according to the weightings of the phoneme and associated graphemes in the weightings table.

3. A generator as in claim 1, further comprising:
search means for searching said dictionary for existing words which match any created word and cancelling that created word because it is a known word.

4. A generator as in claim 1, wherein the neologism means adds combinations of silent phonemes to the phoneme cluster.

5. A method of generating homophonic neologisms comprising:
providing a dictionary table having a plurality of word entries each including an orthography and an associated pronunciation, said pronunciation comprising one or more phonemes, said orthography comprising one or more graphemes;
providing a weightings table having a plurality of entries, each comprising a frequency of occurrence of each phoneme and associated grapheme in the dictionary table, each phoneme having an entry for each grapheme with which the phoneme is associated;
receiving a word to be processed;
dividing said word into its respective phonemes; and
creating words from combinations of graphemes from the weightings table that could be associated with the phonemes in the received word; whereby the created words are homophonically similar to the received word.

6. A method as in claim 5, further comprising:
ordering the created words according to the weightings of the phoneme and associated graphemes in the weightings table.

7. A method as in claim 5, further comprising:
searching said dictionary for existing words which match any created word and cancelling that created word because it is a known word.

8. A method as in claim 5, further comprising:
adding combinations of silent phonemes to the phoneme cluster.

9. A machine-readable storage, having stored thereon a computer program having a plurality of code sections executable by a machine for causing the machine to perform the steps of:
providing a dictionary table having a plurality of word entries each including an orthography and an associated pronunciation, said pronunciation comprising one or more phonemes, said orthography comprising one or more graphemes;
providing a weightings table having a plurality of entries, each comprising a frequency of occurrence of each phoneme and associated grapheme in the dictionary table, each phoneme having an entry for each grapheme with which the phoneme is associated;
receiving a word to be processed;
dividing said word into its respective phonemes; and
creating words from combinations of graphemes from the weightings table that could be associated with the phonemes in the received word; whereby the created words are homophonically similar to the received word.

10. The machine-readable storage of claim 9, further comprising:
ordering the created words according to the weightings of the phoneme and associated graphemes in the weightings table.

11. The machine-readable storage of claim 9, further comprising:
searching said dictionary for existing words which match any created word and cancelling that created word because it is a known word.

12. The machine-readable storage of claim 9, further comprising:
adding combinations of silent phonemes to the phoneme cluster.

* * * * *